United States Patent
Seth (10) Patent No.: US 9,160,681 B2
(45) Date of Patent: Oct. 13, 2015

(54) SPIRAL PROTOCOL FOR ITERATIVE SERVICE LEVEL AGREEMENT (SLA) EXECUTION IN CLOUD MIGRATION

(75) Inventor: Hasit Seth, Pune (IN)

(73) Assignee: Empire Technology Development LLC, Wilmington, DE (US)

(*) Notice: Subject to any disclaimer, the term of this patent is extended or adjusted under 35 U.S.C. 154(b) by 318 days.

(21) Appl. No.: 13/641,126

(22) PCT Filed: Mar. 15, 2012

(86) PCT No.: PCT/IB2012/000478
§ 371 (c)(1),
(2), (4) Date: Oct. 14, 2012

(87) PCT Pub. No.: WO2013/110965
PCT Pub. Date: Aug. 1, 2013

(65) Prior Publication Data
US 2013/0246623 A1 Sep. 19, 2013

(51) Int. Cl.
*H04L 12/70* (2013.01)
*H04L 12/911* (2013.01)
*G06F 9/50* (2006.01)

(52) U.S. Cl.
CPC ............ *H04L 47/783* (2013.01); *G06F 9/5072* (2013.01)

(58) Field of Classification Search
CPC ............................ H04L 47/783; G06F 9/5072
USPC ........................................................ 709/226
See application file for complete search history.

(56) References Cited

U.S. PATENT DOCUMENTS

| | | | |
|---|---|---|---|
| 2009/0193427 A1 | 7/2009 | Pu et al. | |
| 2010/0250746 A1 | 9/2010 | Murase | |
| 2010/0318609 A1 | 12/2010 | Lahiri et al. | |
| 2011/0029882 A1 | 2/2011 | Jaisinghani | |
| 2011/0179141 A1 | 7/2011 | Ravichandran et al. | |
| 2011/0191781 A1 | 8/2011 | Karanam et al. | |
| 2011/0231552 A1 | 9/2011 | Carter et al. | |
| 2011/0295999 A1* | 12/2011 | Ferris et al. | 709/224 |
| 2012/0054626 A1* | 3/2012 | Odenheimer | 715/738 |
| 2012/0089726 A1* | 4/2012 | Doddavula | 709/224 |
| 2012/0240135 A1* | 9/2012 | Risbood et al. | 719/328 |

(Continued)

FOREIGN PATENT DOCUMENTS

WO 2011098482 A1 8/2011

OTHER PUBLICATIONS

Theilmann, "Managing ON-Demand Business Applications with Hierarchical Service Level Agreements", FIS 2010, LNCS 6369, pp. 97-106, 2010.*

(Continued)

*Primary Examiner* — Brian J Gillis
*Assistant Examiner* — Amy Ling
(74) *Attorney, Agent, or Firm* — Turk IP Law, LLC (57) ABSTRACT

Technologies are presented for a spiral protocol for iterative Service Level Agreement (SLA) execution in cloud migration that can provide a normalized bridge across disparate cloud architectures for migration, which may be performed in an incremental manner in a spiral—i.e., from inner most set of core non-negotiable parameters to optional parameters. The spiral progression may be incremental with fault tolerance by re-trial, roll-back, or renegotiation. The migration process may be back-tracked with features to negotiate the migration repeatedly.

16 Claims, 7 Drawing Sheets

(56) References Cited

U.S. PATENT DOCUMENTS

2013/0138816 A1* 5/2013 Kuo et al. .................... 709/226
2014/0082166 A1* 3/2014 Robinson et al. ............. 709/223

OTHER PUBLICATIONS

Dastjerdi, "A dependency-aware ontology-based approach for deploying service level agreement monitoring services in Cloud", Software—Practice and Experience, 2012:42:501-518; Published online Jul. 27, 2011 in Wiley Online Library (wileyonlinelibrary.com).*

Bodenstaff, "Monitoring Dependencies for SLAs: The MoDe4SLA Approach", IEEE Computer Society, 2008 IEEE International Conference on Services Computing.*

Sheehan, "Operating System", https://www.cs.auckland.ac.nz/courses/compsci340sc, Sep. 7, 2010.*

International Search Report and Written Opinion for PCT/IB2012/000478 Filed on Mar. 15, 2012, mailed on Jul. 25, 2012.

* cited by examiner

SPIRAL PROTOCOL FOR ITERATIVE SERVICE LEVEL AGREEMENT (SLA) EXECUTION IN CLOUD MIGRATION

CROSS-REFERENCE TO RELATED APPLICATIONS

This Application is the National Stage filing under 35 U.S.C. §371 of PCT Application No. PCT/IB2012/000478 filed on Mar. 15, 2012, which claims priority under 35 U.S.C. §119(a) and (b) of India Application No. 234/DEL/2012 filed on Jan. 27, 2012. The disclosures of the PCT and India Applications are hereby incorporated by reference in their entireties.

BACKGROUND

Unless otherwise indicated herein, the materials described in this section are not prior art to the claims in this application and are not admitted to be prior art by inclusion in this section.

With the advance of networking and data storage technologies, an increasingly large number of computing services are being provided to users or customers by cloud based datacenters that can enable leased access to computing resources at various levels. Datacenters can provide individuals and organizations with a range of solutions for systems deployment and operation. Depending on customer needs, datacenter capabilities, and associated costs, services provided to customers may be defined by Service Level Agreements (SLAs) describing aspects such as server latency, storage limits or quotas, processing power, scalability factors, backup guarantees, uptime guarantees, resource usage reporting, and similar ones.

Not all cloud architectures are similar in terms of scope and performance requirements. For example, a cloud based email or photo sharing application is likely to have different operating parameters compared to a cloud based video gaming service. The underlying cloud platform software may also be different. When a customer decides to move its data and/or applications from one cloud to another (e.g., from one datacenter to another), the process may be relatively cumbersome due to lack of methods to formalize, normalize, and communicate computing requirements across clouds.

SUMMARY

The present disclosure generally describes technologies for employing a spiral protocol for iterative service level agreement execution in cloud migration.

According to some example embodiments, a method for implementing a spiral protocol for iterative Service Level Agreement (SLA) execution in a cloud migration may include determining a plurality of SLA parameters, categorizing each SLA parameter within the plurality of SLA parameters into one or more groups, forming the spiral protocol based on the plurality of SLA parameters and the one or more groups, where each group corresponds to a loop of the spiral protocol, and executing the cloud migration by following the spiral protocol one loop at a time.

According to other example embodiments, a computing device for implementing a spiral protocol for iterative Service Level Agreement (SLA) execution in a cloud migration may include a memory configured to store instructions and a processing unit configured to execute a migration application in conjunction with the instructions. The migration application may determine a plurality of SLA parameters; categorize each SLA parameter within the plurality of SLA parameters into one or more groups; form the spiral protocol based on the plurality of SLA parameters and the one or more groups, where each group corresponds to a loop of the spiral protocol; and execute the cloud migration by following the spiral protocol one loop at a time.

According to further example embodiments, a computer-readable storage medium may have instructions stored thereon for implementing a spiral protocol for iterative Service Level Agreement (SLA) execution in a cloud migration. The instructions may include determining a plurality of SLA parameters; categorizing each SLA parameter within the plurality of SLA parameters into one or more groups; forming the spiral protocol based on the plurality of SLA parameters and the one or more groups, where each group corresponds to a loop of the spiral protocol; and executing the cloud migration by following the spiral protocol one loop at a time.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying, drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to implementing a spiral protocol for iterative SLA execution in cloud migration.

Briefly stated, technologies are presented for a spiral protocol for iterative Service Level Agreement (SLA) execution in cloud migration that can provide a normalized bridge across disparate cloud architectures for migration, which may be performed in an incremental manner in a spiral—i.e., from inner most set of core non-negotiable parameters to optional parameters. The spiral progression may be incremental with fault tolerance by re-trial, roll-back, or renegotiation. The migration process may be back-tracked with features to negotiate the migration repeatedly.

Figure 1:
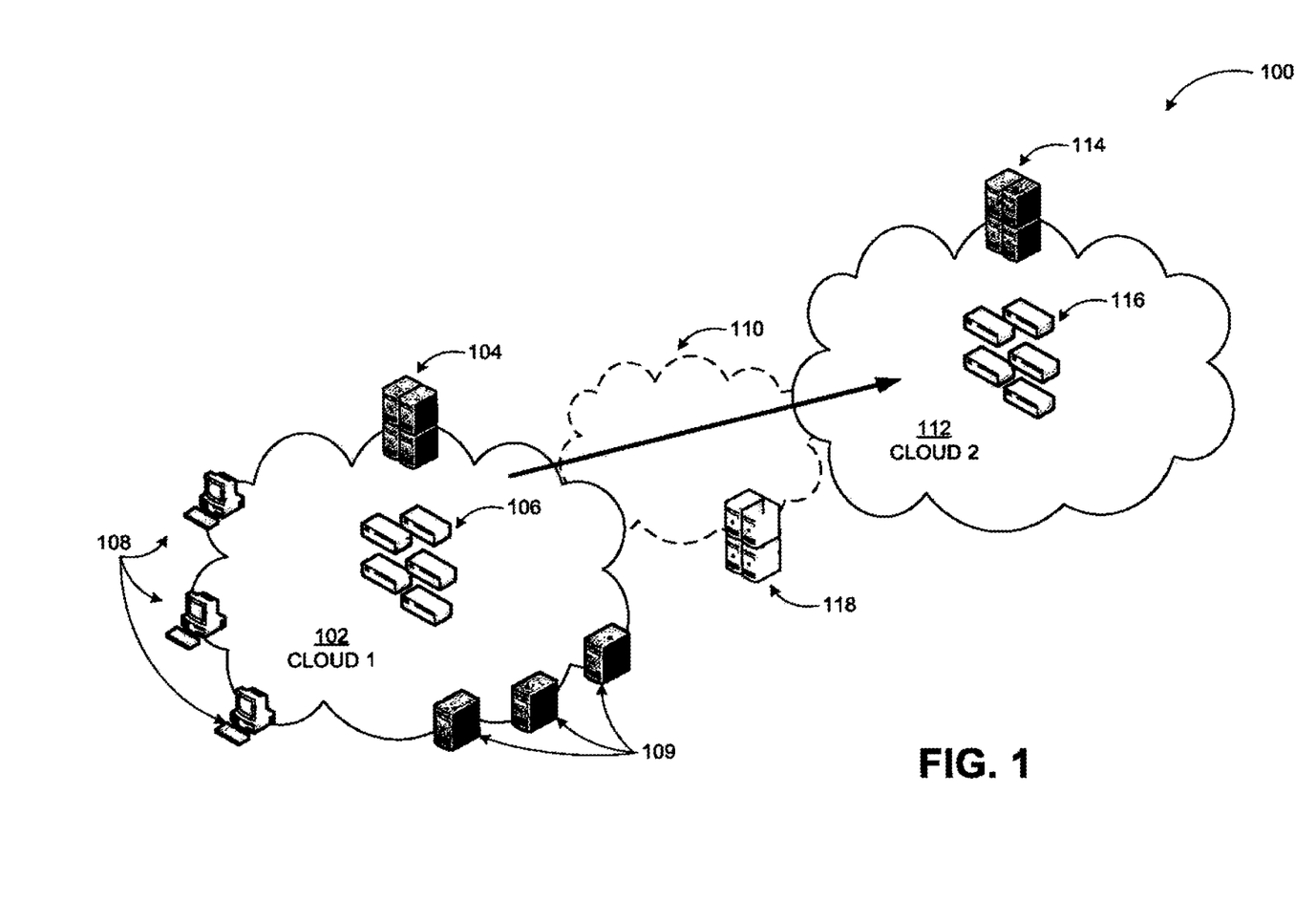
FIG. 1 illustrates an example system, where a spiral protocol for iterative SLA execution in cloud migration may be implemented.

FIG. 1 illustrates an example system, where a spiral protocol for iterative SLA execution in cloud migration may be implemented, arranged in accordance with at least some embodiments described herein.

As shown in a diagram 100, a cloud 1 (102) may boat services such as various applications, data storage, data processing, or comparable ones for individual or enterprise customers 108 and 109. The cloud 1 (102) may include one or more datacenters providing the services and employ one or more servers 104 and/or one or more special purpose devices 106 such as firewalls, routers, and so on. In providing the services to its customers, the cloud 1 (102) may employ multiple servers, special purpose devices, physical or virtual data stores, etc. Thus, a hosted application provided to a customer or data stored for a customer may involve a complex architecture of hardware and software components. The complexity may become a burden when a customer decides to migrate to another cloud.

Clouds may have disparate architectures and provide similar services but with distinct parameters. For example, data storage capacity, processing capacity, server latency, and similar aspects may differ from cloud to cloud. Furthermore, the service parameters may vary depending on the provided service. To reduce the burden of comparing clouds and performing the actual migration with substantially reduced burden, some embodiments described herein enable cloud migration through iterative execution of SLAs using a spiral protocol.

In the diagram 100, the cloud 1 (102) may be a source cloud and a cloud 2 (112) may be a target cloud in a migration process. Similar to the cloud 1 (102), the cloud 2 (112) may also employ one or more server 114 and one or more special purpose devices 116 to provide its services. The migration employing a spiral protocol of iteratively executed SLAs may be managed and performed by one of the servers 104 of the cloud 1 (102), one of the servers 114 of the cloud 2 (112), or by a third party service executed on one or more servers 118 of another cloud 110.

Figure 2:
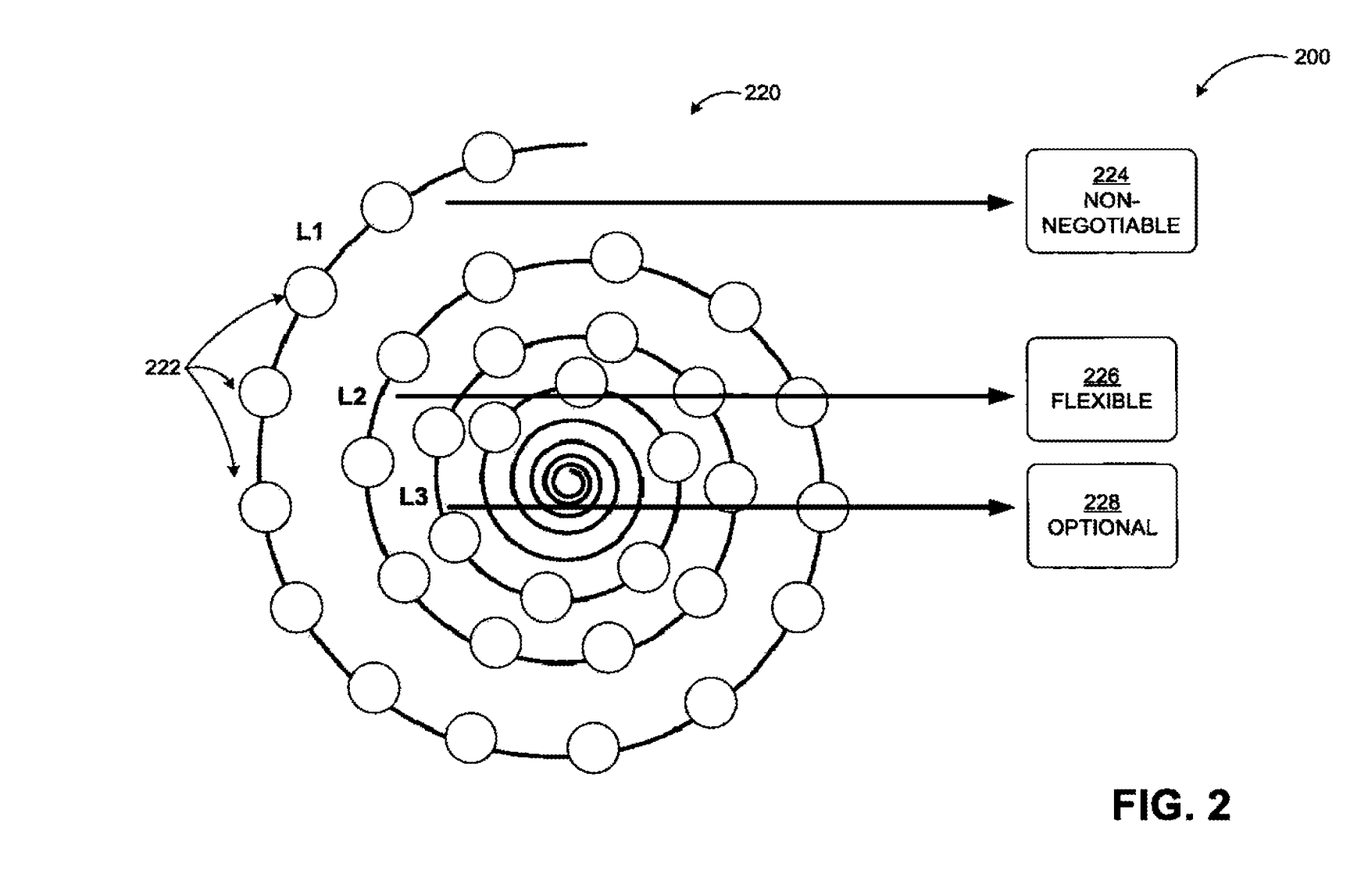
FIG. 2 conceptually illustrates an example spiral protocol for iterative SLA execution in cloud migration.

FIG. 2 conceptually illustrates an example spiral protocol for iterative SLA execution in cloud migration, arranged in accordance with at least some embodiments described herein.

A diagram 200 conceptually illustrates how a spiral protocol 220 for iterative SLA execution in cloud migration can provide a normalized bridge across disparate cloud architectures in an incremental manner. The SLA parameters may be categorized in groups according to their attributes such as core or non-negotiable parameters to optional parameters. The spiral progression may be incremental with each loop corresponding to one or more SLA parameter groups and nodes 222 on each loop corresponding to individual SLA parameters. The execution of the spiral may be inward or outward. In the example shown in the diagram 200, an outermost loop L1 may correspond to non-negotiable parameters 224, a next inner loop L2 may correspond to flexible parameters 226, and a next inner loop L3 may correspond to optional parameters 228, and so on.

The number of categories and the grouping of the SLA parameters in the categories may be according to agreed standards, cloud definitions, and/or customer preferences. For example, the non-negotiable parameters 224 may include server latency, storage limits or quotas, processing power, scalability factors, backup guarantees, uptime guarantees and so on. The flexible parameters 226 may include resource usage reporting, automatic parallelization, and similar ones. The optional parameters 228 may be used by each cloud platform maker to add custom parameters that are over and above the core parameters. During the incremental execution, each loop may be started upon successful completion of a previous loop. Fault tolerance may be built in by re-trial, roll-back, or renegotiation at each loop level.

Grouping of the SLA parameters may be performed by the user designing the loop or automatically by an algorithm (e.g., code which groups all storage related parameters in the innermost loop, etc.). Alternately, a program may populate the parameter groups and allow a user to modify or fine tune them. Complexity of migration, prioritization of the parameters or further higher level granularity may be built in by grouping parameters and increasing or decreasing the looping.

As mentioned above, each loop may be a logically or functionally separate segment of parameters or groups to be executed. Successful execution of each loop may indicate that a certain set of parameters are migrated, and hence a phase or stage of migration has progressed without the need to backtrack.

Figure 3:
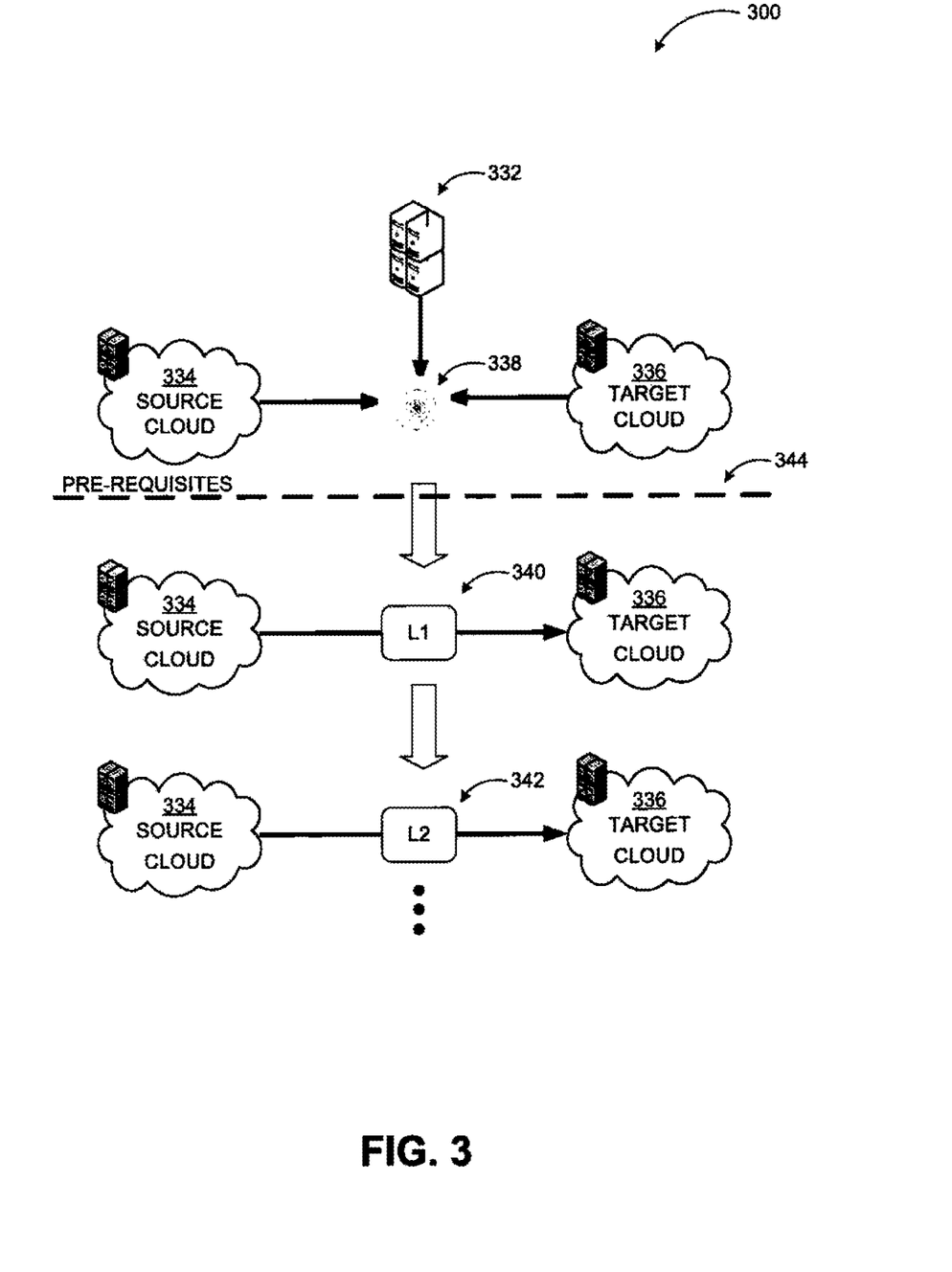
FIG. 3 illustrates example iterations in a spiral protocol implemented SLA execution for cloud migration.

FIG. 3 illustrates example iterations in a spiral protocol implemented SLA execution for cloud migration, arranged in accordance with at least some embodiments described herein.

A cloud migration process in a system according to some embodiments may begin with the definition of the spiral protocol by a source cloud, a target cloud, or a third party service. As shown in a diagram 300, a source cloud operator 334 (from which the migration happens), a target cloud operator 336 (to which the migration happens), and/or a third party service 332 may individually or collectively select (interactively or in other ways) spiral protocol 338 parameters that may be categorized as core. Additionally, custom parameters may be added by any of the parties through a negotiation process. This process of translating a SLA or implementing the SLA in a particular migration instance forms pre-requisites 344 for the migration.

Once the pre-requisites 344 are in place, the migration may begin with execution of the parameters in each loop in an outward or inward direction starting with the core parameters. For example, the inner most loop L1 (340) may define the non-negotiable core parameters and upon verifying a match between the source cloud 334 and the target cloud 336 for each of the parameters in loop L1 (340) the migration may begin. Upon successful completion of the first loop, a second loop L2 (342) may be executed. The second loop may include further core parameters, flexible parameters, optional parameters, or any other category that may be defined by the parties.

According to some examples, each parameter's definition may include instructions for actions to be taken for backtracking if the migration of the parameter is unsuccessful. Backtracking actions may include, but are not limited to, retry a predefined number of attempts, request user input, request cloud operator input, skip the parameter (if it is not non-negotiable), re-execute a previous set of parameters, or terminate migration.

According to further examples, negotiation between the source and target hosts may be enabled to verify or dry-run the parameters acceptance from source to target requests and responses. Hence, a need to move data and/or code each time a parameter is accepted by the target host may be eliminated or reduced. Following a successful test/dry nm/shell run, data can be moved to the target host manually or via a network transfer.

According to yet other examples, a third party computer, host or a Software-As-A-Service (SAAS) provider may also provide the shell execution or actual transfer service. If the third party service 332 is performing the migration or if cost is to calculated, billing features linked to migration cost may be appended to the spiral protocol. For example, migration cost may be estimated via a dry run. While one host and one source is used to simplify description herein, the exercise of migration may be easily implemented in one source-multiple host, multiple sources-single host or multiple-sources-and-hosts scenarios.

Figure 4:
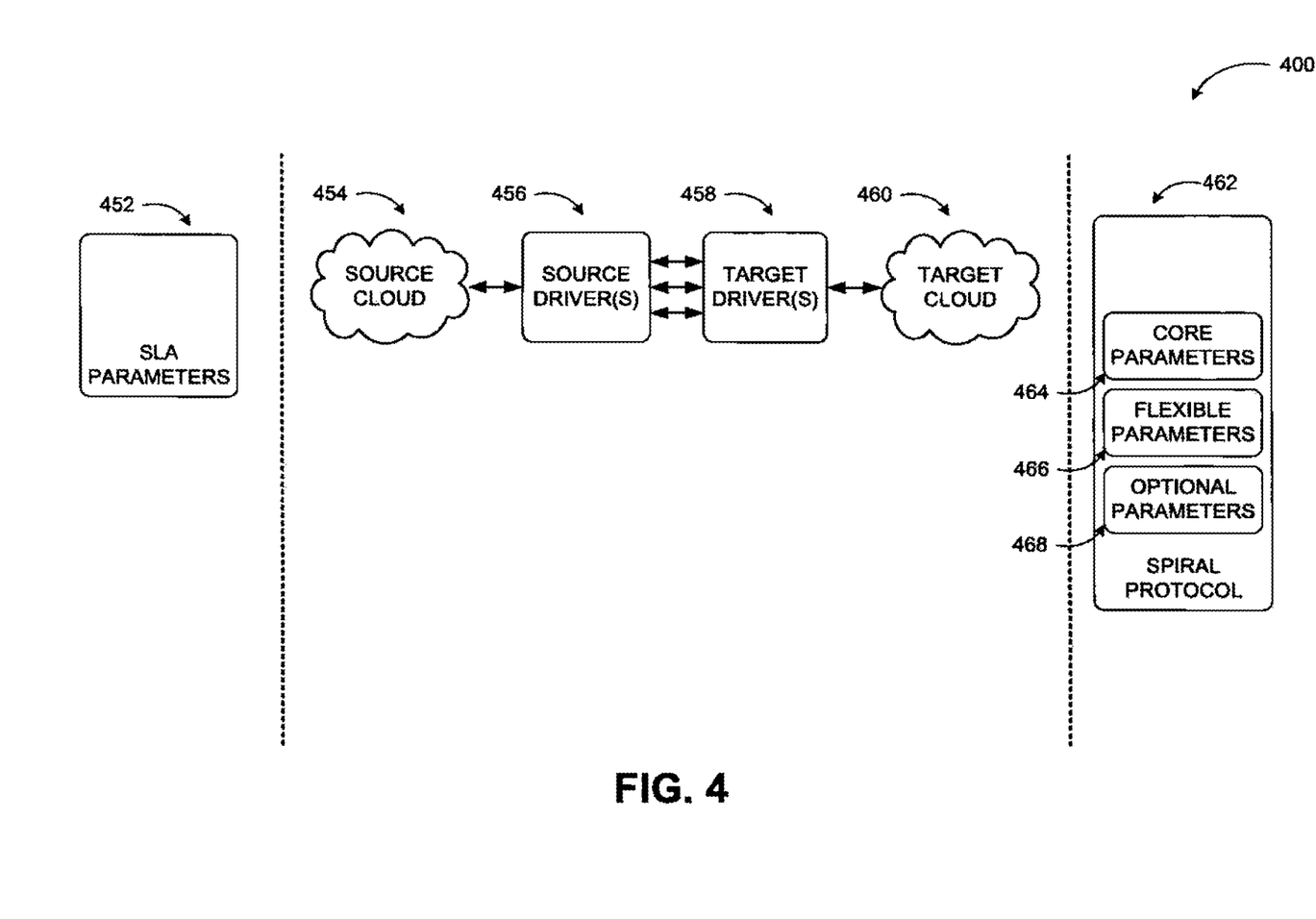
FIG. 4 illustrates an architecture of an example system for iterative SLA execution in cloud migration through a spiral protocol.

FIG. 4 illustrates as architecture of an example system for iterative SLA execution in cloud migration through a spiral protocol, arranged in accordance with at least some embodiments described herein.

As shown in a diagram 400, SLA parameters 452 may be executed as loops in a spiral and published to both source and target clouds. The negotiation of which SLA parameters are to be executed, their respective categories (or priority levels), the actual execution of the protocol and related actions (backtracking, fault tolerance, etc.) may be performed through one or more source drivers 456 at a source cloud 454 and one or more target drivers 458 at a target cloud 460.

The source drivers 456 and the target drivers 458 may comply with the defined spiral protocol 462 and perform the actual loop progression and migration. As discussed above, the spiral protocol 462 may include the parameters grouped according to their attributes such as core parameters 464, flexible parameters 466, and optional parameters 468. In one example, the source drivers 456 on the source cloud 454 may attempt to spirally migrate components listed as core first if the requested parameters are accepted by the target drivers 458 at the target cloud 460. Once the core parameters are negotiated, the spiral may propagate further to other parameters. Data can be moved in stages if certain parameters are acceptable (for example, a core data store can be moved if the storage capacity core parameter is successfully negotiated between the source and target clouds). Fault tolerance and analytical components that use statistical methods to reduce errors may be built in to the spiral protocol.

Figure 5:
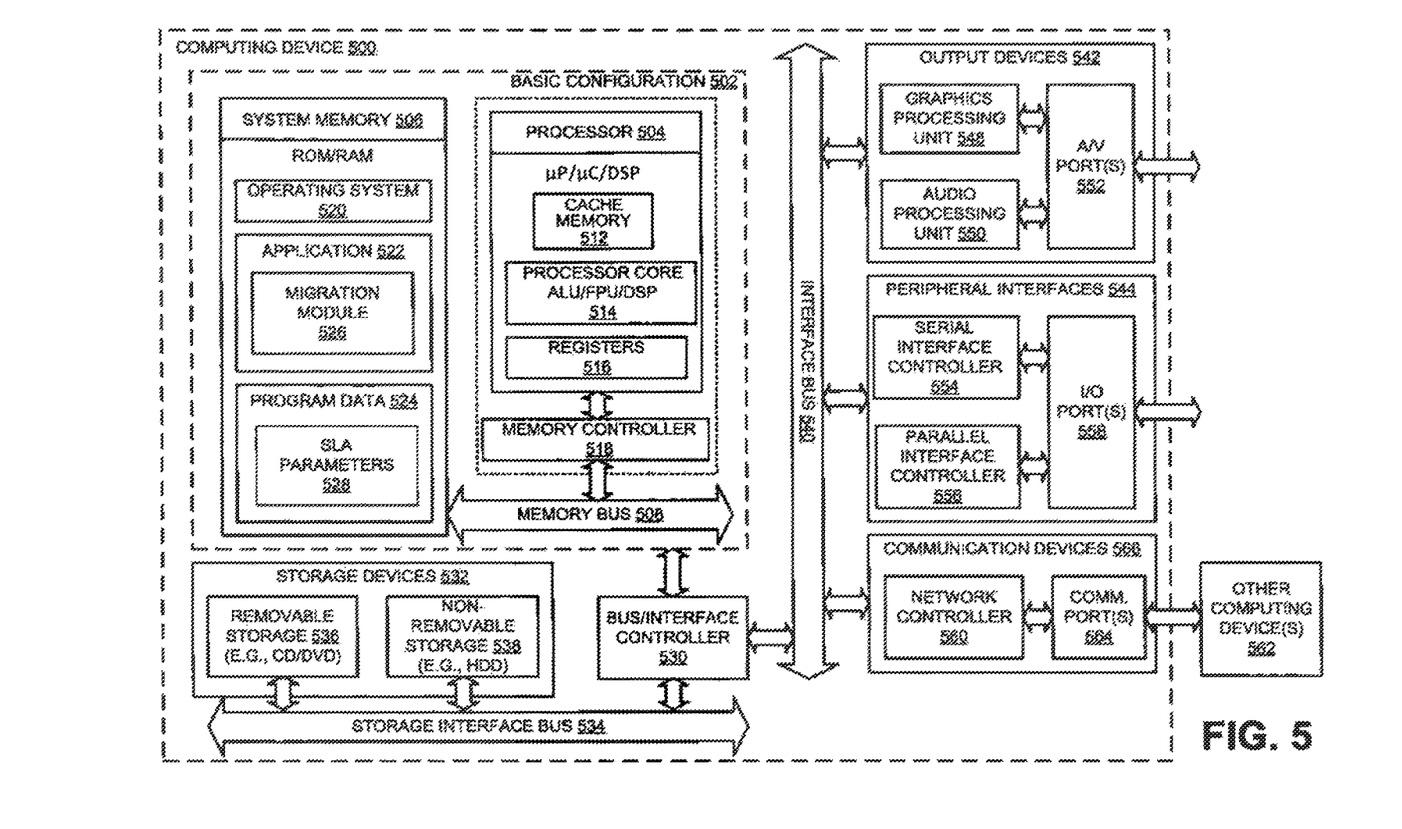
FIG. 5 illustrates a general purpose computing device, which may be used to implement a spiral protocol for iterative SLA execution in cloud migration.

FIG. 5 illustrates a general purpose computing device 500, which may be used to implement a spiral protocol for iterative SLA execution in cloud migration, arranged in accordance with at least some embodiments described herein. For example, the computing device 500 may be used as servers 104, 114, or 118 of FIG. 1. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (µP), a microcontroller (µC), a digital signal processor (DSP), or any combination thereof. The processor 504 may include one more levels of caching, such as a cache memory 512, a processor care 514, and registers 516. The example processor core 514 may include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, one or more applications 522, and program data. 524. The applications 522 may include a cloud management application, including a migration module 526, which may manage cloud-to-cloud migration of applications and data as described herein. The program data 524 may include, among other data SLA parameters 528, or the like, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and non-volatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (e.g., one or more output devices 542, one or more peripheral interfaces 544, and one or more communication devices 566) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 566 includes a network controller 560, which may be arranged to facilitate communications with one or more other computing devices 562 over a network communication link via one or more communication ports 564. The one or more other computing devices 562 may include servers at a datacenter, user equipment, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as apart of a general purpose or specialized server, mainframe, or similar computer that includes any of the above functions. The computing device 500 may also be implemented as a personal computer including both laptop computer and non-laptop computer configurations.

These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other examples, the human interaction can be automated such as by pre-selected criteria that may be machine automated.

Figure 6:
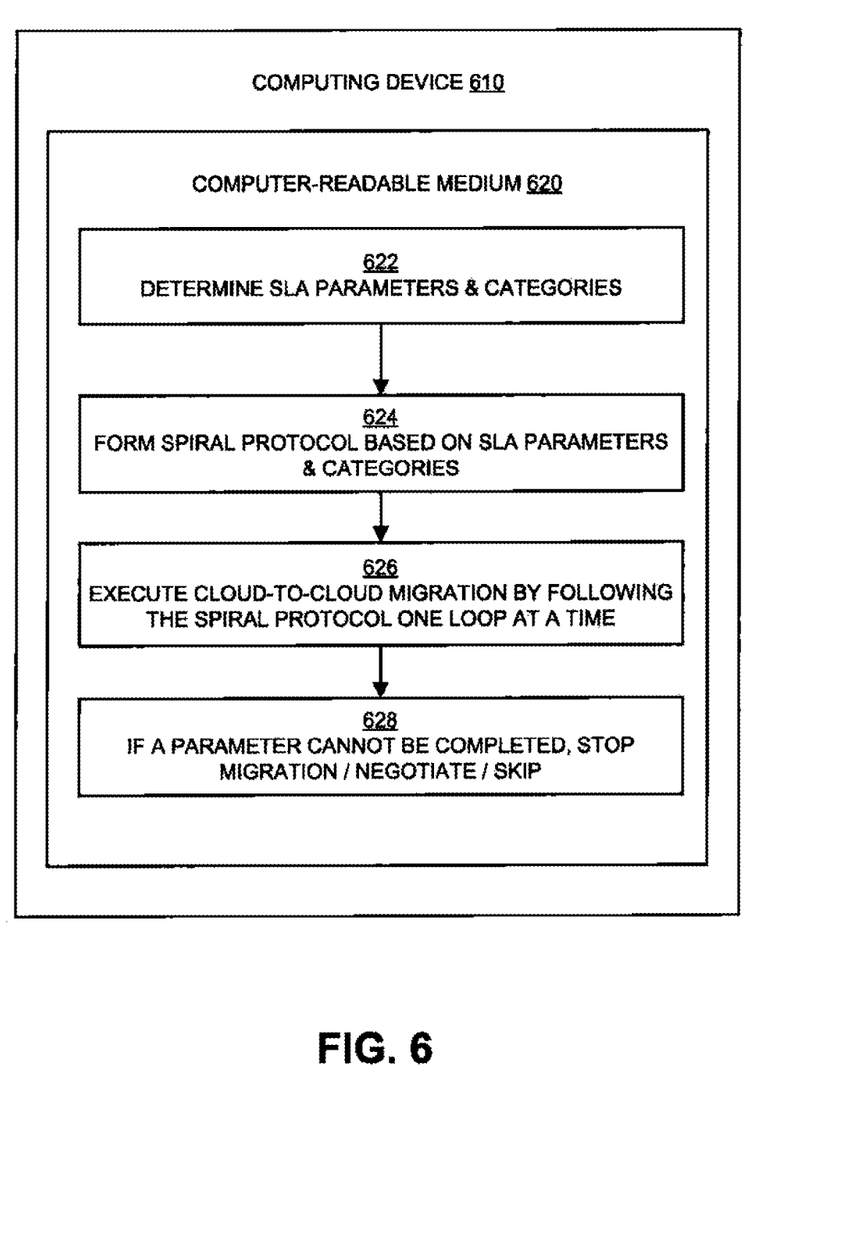
FIG. 6 is a flow diagram illustrating an example method that may be performed by a computing device such as device 500 in FIG. 5.

FIG. 6 is a flow diagram illustrating an example method that may be performed by a computing device such as the device 500 in FIG. 5, arranged in accordance with at least some embodiments described herein. Example methods may include one or more operations, functions or actions as illustrated by one or more of blocks 622, 624, 626, and/or 628. The operations described in the blocks 622 through 628 may also be stored as computer-executable instructions in a computer-readable medium such as a computer-readable medium 620 of a computing device 610.

An example process for providing a spiral protocol for iterative service level agreement execution in cloud migration may begin with block 622, "DETERMINE SLA PARAMETER & CATEGORIES", where a migration module or application (e.g., the migration module 526 of FIG. 5) executed on a source cloud server (e.g. the servers 104 of FIG. 1), a target cloud server (e.g. the servers 114 of FIG. 1), or a third party server (e.g. the servers 118 of FIG. 1) may determine core, extendable, and optional SLA parameters and respective categories.

Block 622 may be followed by block 624, "FORM SPIRAL PROTOCOL BASED ON SLA PARAMETERS & CATEGORIES", where the migration module 526 may generate the spiral protocol using the SLA parameters and their respective categories. Block 624 may be followed by block 626, "EXECUTE CLOUD-TO-CLOUD MIGRATION BY FOLLOWING THE SPIRAL PROTOCOL ONE LOOP AT A TIME", where the cloud migration may be executed using the spiral protocol loop by loop with each loop corresponding to an SLA parameter.

If a loop (i.e., parameter) cannot be completed, the loop may be renegotiated, the migration stopped, or the loop skipped depending on a category of the parameter as indicated at block 628, "IF A PARAMETER CANNOT BE COMPLETED, STOP MIGRATION/NEGOTIATE/SKIP" following block 626.

The blocks included in the above described process are for illustration purposes. A spiral protocol for iterative service level agreement execution in cloud migration may be implemented by similar processes with fewer or additional blocks, for example, employing block depicted in FIG. 1 and FIG. 4. In some examples, the blocks may be performed in a different order. In some other examples, various blocks may be eliminated. In still other examples, various blocks may be divided into additional blocks, or combined together into fewer blocks.

Figure 7:
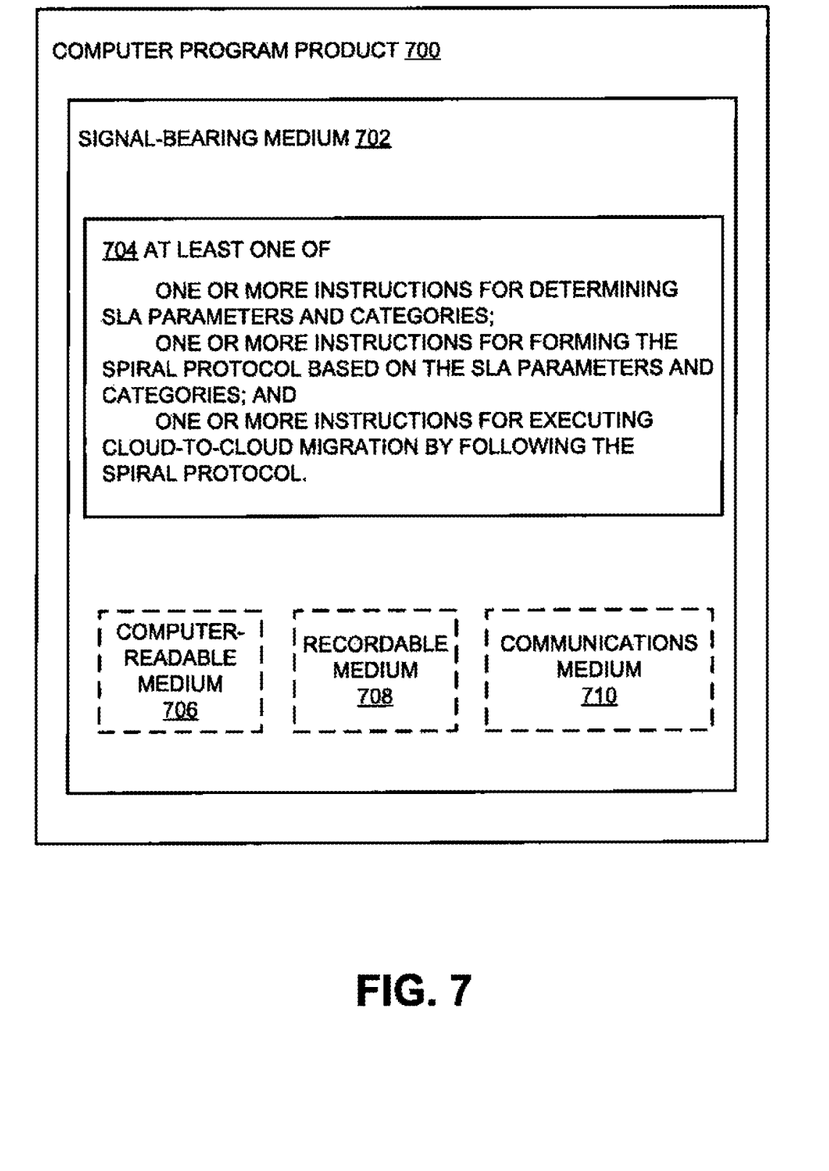
FIG. 7 illustrates a block diagram of an example computer program product, all arranged in accordance with at least some embodiments described herein.

FIG. 7 illustrates a block diagram of an example computer program product, arranged in accordance with at least some embodiments described herein.

In some examples, as shown in FIG. 7, the computer program product 700 may include a signal bearing medium 702 that may also include one or more machine readable instructions 704 that, when executed by, for example, a processor, may provide the functionality described herein. Thus, for example, referring to the processor 504 in FIG. 5, the migration module 526 may undertake one or more of the tasks shown in FIG. 7 in response to the instructions 704 conveyed to the processor 504 by the medium 702 to perform actions associated with providing a spiral protocol for iterative SLA execution as described herein. Some of those instructions may include, for example, instructions for determining SLA parameters and categories, forming the spiral protocol based on the SLA parameters and categories, and executing cloud-to-cloud migration by following the spiral protocol, according to some embodiments described herein.

In some implementations, the signal bearing medium 702 depicted in FIG. 7 may encompass a computer-readable medium 706, such as, but not limited to, a hard disk drive, a solid state drive, a Compact Disc (CD), a Digital Versatile Disk (DVD), a digital tape, memory, etc. In some implementations, the signal bearing medium 702 may encompass a recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, the program product 700 may be conveyed to one or more modules of the processor 504 by an RF signal bearing medium, where the signal bearing medium 702 is conveyed by the wireless communications medium 710 (e.g., a wireless communications medium conforming with the IEEE 802.11 standard).

According to some example embodiments, a method for implementing a spiral protocol for iterative Service Level Agreement (SLA) execution in a cloud migration may include determining a plurality of SLA parameters, categorizing each SLA parameter within the plurality of SLA parameters into one or more groups, forming the spiral protocol based on the plurality of SLA parameters and the one or mare groups, where each group corresponds to a loop of the spiral protocol, and executing the cloud migration by following the spiral protocol one loop at a time.

According to other examples, the method may also include implementing a progression of the spiral protocol incrementally with fault tolerance by one or more of re-trial and roll-back. The SLA parameters may be organized from an inner loop to an outer loop of the spiral protocol according to an importance level of the SLA parameters. The method may further include in response to a failure in one of the loops of the spiral protocol, back-tracking the cloud migration to negotiate the cloud migration repeatedly. The SLA parameters may also be selected by one or more of a source cloud operator, a target cloud operator, and a third party facilitator. Executing the cloud migration may include following the spiral protocol includes moving data from a source cloud to a target aloud in stages upon acceptance of each SLA parameter by the source cloud and the target cloud.

According to further examples, the one or more groups may include core parameters and extendable parameters. The core parameters may include at least one from a set of: a server latency, a storage limit, a storage quota, a scalability factor, a backup guarantee, and/or an uptime guarantee. The extendable parameters may include at least one from a set of: a processing power, a concurrent maximum users limit, a data roll back capacity, a real-time mirroring capability, a resource usage reporting capability, an audit trail capability, and/or a support capability, and/or an automatic parallelization of code for a parallel computing environment. The extendable parameters may also include a set of flexible parameters and a set of optional parameters, each corresponding to a loop in the spiral protocol.

According to yet other examples, the method may include executing a first loop of the spiral protocol corresponding to the core parameters and proceeding to a second loop of the spiral protocol upon successful completion of the first loop, and if execution of a loop corresponding to one or more of the extendable parameters is unsuccessful, one of: renegotiating the one or more of the extendable parameters of the loop, skipping the loop, and terminating the cloud migration. Categorizing the plurality of SLA parameters into one or more groups may include one or more of: a user input, an automated algorithm, and/or a code-based population of the parameter groups modifiable by the user. Each SLA parameter's definition may include instructions for actions to be taken for backtracking if migration of the SLA parameter is unsuccessful. The method may also include facilitating negotiation of the plurality of SLA parameters between a source cloud and a target cloud, and performing a dry-run of the cloud migration without moving data. The cloud migration may include one of a single source to multiple target migration, a multiple source to single target migration, and a multiple source to multiple target migration.

According to other example embodiments, a computing device for implementing a spiral protocol for iterative Service Level Agreement (SLA) execution in a cloud migration may include a memory configured to store instructions and a processing unit configured to execute a migration application in conjunction with the instructions. The migration application may determine a plurality of SLA parameters; categorize each SLA parameter within the plurality of SLA parameters into one or more groups; form the spiral protocol based on the plurality of SLA parameters and the one or more groups, where each group corresponds to a loop of the spiral protocol; and execute the cloud migration by following the spiral protocol one loop at a time.

According to some examples, the migration application may further implement a progression of the spiral protocol incrementally with fault tolerance by one or more of re-trial and roll-back. The SLA parameters may be organized from an inner loop to an outer loop of the spiral protocol according to an importance level of the SLA parameters. The migration application may also back-track the cloud migration to negotiate the cloud migration repeatedly in response to a failure in one of the loops of the spiral protocol. The SLA parameters may be selected by one or more of: a source cloud operator, a target cloud operator, and a third party facilitator. The migration application may execute the cloud migration by following the spiral protocol includes moving data from a source cloud to a target cloud in stages upon acceptance of each SLA parameter by the source cloud and the target cloud.

According to further examples, the one or more groups may include core parameters and extendable parameters. The core parameters may include at least one from a set of: a server latency, a storage limit, a storage quota, a scalability factor, a backup guarantee, and/or an uptime guarantee. The extendable parameters may include at least one from a set of: a processing power, a concurrent maximum users limit, a data roll back capacity, a real-time mirroring capability, a resource usage reporting capability, an audit trail capability, and/or a support capability, and/or an automatic parallelization of code for a parallel computing environment. The extendable parameters may also include a set of flexible parameters and a set of optional parameters, each corresponding to a loop in the spiral protocol.

According to other examples, the migration application may execute a first loop of the spiral protocol corresponding to the core parameters and proceeding to a second loop of the spiral protocol upon successful completion of the first loop, and if execution of a loop corresponding to one or more of the extendable parameters is unsuccessful, one of: renegotiate the one or more of the extendable parameters of the loop, skip the loop, and terminate the cloud migration. The migration application may categorize the plurality of SLA parameters into one or more groups by one or more of: a user input, an automated algorithm, and/or a code-based population of the parameter groups modifiable by the user. Each SLA parameter's definition may include instructions for actions to be taken for backtracking if migration of the SLA parameter is unsuccessful. The migration application may also facilitate negotiation of the plurality of SLA parameters between a source cloud and a target cloud and perform a dry-run of the cloud migration without moving data. The cloud migration may include one of a single source to multiple target migration, a multiple source to single target migration, and a multiple source to multiple target migration. The migration application may be part of one of: a source cloud, a target cloud, and a third party service.

According to further example embodiments, a computer-readable storage medium may have instructions stored thereon for implementing a spiral protocol for iterative Service Level Agreement (SLA) execution in a cloud migration. The instructions may include determining a plurality of SLA parameters; categorizing each SLA parameter within the plurality of SLA parameters into one or more groups; forming the spiral protocol based on the plurality of SLA parameters and the one or more groups, where each group corresponds to a loop of the spiral protocol; and executing the cloud migration by following the spiral protocol one loop at a time.

According to other examples, the instructions may also include implementing a progression of the spiral protocol incrementally with fault tolerance by one or more of re-trial and roll-back, or providing the fault tolerance if the spiral protocol cannot progress further because of a failure of a source cloud and a target cloud to agree on one or more SLA parameters. The SLA parameters may be organized from an inner loop to an outer loop of the spiral protocol according to an importance level of the SLA parameters. The instructions may further include back-tracking the cloud migration to negotiate the cloud migration repeatedly in response to a failure in one of the loops of the spiral protocol. The SLA parameters may be selected by one or more of a source cloud operator, a target cloud operator, and a third party facilitator. Executing the cloud migration may be performed by following the spiral protocol includes moving data from a source cloud to a target cloud in stages upon acceptance of each SLA parameter by the source cloud and the target cloud.

According to further examples, the one or more groups may include core parameters and extendable parameters. The core parameters may include at least one from a set of: a server latency, a storage limit, a storage quota, a scalability factor, a backup guarantee, and/or an uptime guarantee. The extendable parameters may include at least one from a set of a processing power, a concurrent maximum users limit, a data roll back capacity, a real-time mirroring capability, a resource usage reporting capability, an audit trail capability, and/or a support capability, and/or an automatic parallelization of code for a parallel computing environment. The extendable parameters may also include a set of flexible parameters and a set of optional parameters, each corresponding to a loop in the spiral protocol.

According to yet other examples, the instructions may include executing a first loop of the spiral protocol corresponding to the core parameters and proceeding to a second loop of the spiral protocol upon successful completion of the first loop. If execution of a loop corresponding to one or more of the extendable parameters is unsuccessful, the one or more of the extendable parameters of the loop may be renegotiated, the loop skipped, or the cloud migration terminated. Categorizing the plurality of SLA parameters into one or more groups may include one or more of: a user input, an automated algorithm, and/or a code-based population of the parameter groups modifiable by the user. Each SLA parameter's definition may include instructions for actions to be taken for backtracking if migration of the SLA parameter is unsuccessful. The instructions may further include facilitating negotiation of the plurality of SLA parameters between a source cloud and a target cloud; and performing a dry-run of the cloud migration without moving data. The cloud migration may include one of: a single source to multiple target migration, a multiple source to single target migration, and a multiple source to multiple target migration.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those killed in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth heroin, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to implement a spiral protocol for iterative Service Level Agreement (SLA) execution in a cloud migration from a source cloud to a target cloud, the method comprising:

determining, by one or more devices comprised within the source cloud, SLA parameters;

categorizing, by the one or more devices, each SLA parameter within the SLA parameters into groups;

forming, by the one or more devices, the spiral protocol based on the SLA parameters and the groups, wherein each group corresponds to a loop of the spiral protocol and the SLA parameters are organized from an inner loop to a first outer loop to a second outer loop of the spiral protocol according to an importance level of the SLA parameters;

executing, by the one or more devices, the cloud migration from the source cloud to the target cloud by following the spiral protocol one loop at a time;

in response to a determination that an execution of the inner loop corresponding to one or more core parameters is unsuccessful during the cloud migration from the source cloud to the target cloud, terminating, by the one or more devices, the cloud migration; else in response to a determination that the execution of the inner loop is successful, executing, by the one or more devices, the first outer loop corresponding to one or more extendable parameters; and in response to a determination that the execution of the first outer loop is unsuccessful during the cloud migration from the source cloud to the target cloud, skipping, by the one or more devices, continued execution of the first outer loop and executing, by the one or more devices, the second outer loop.

2. The method according to claim 1, further comprising:
implementing, by the one or more devices, a progression of the spiral protocol incrementally with fault tolerance by one or more of re-trial and roll-back.

3. The method according to claim 1, wherein the SLA parameters are selected by one or more of: a source cloud operator, a target cloud operator, and a third party facilitator.

4. The method according to claim 1, further comprising:
in response to a failure in one of the loops of the spiral protocol, back-tracking, by the one or more devices, the cloud migration from the source cloud to the target cloud to negotiate the cloud migration repeatedly.

5. The method according to claim 1, wherein executing the cloud migration from the source cloud to the target cloud by following the spiral protocol includes moving data from the source cloud to the target cloud in stages upon acceptance of each SLA parameter by the source cloud and the target cloud.

6. The method according to claim 1, wherein the groups include the one or more core parameters comprising at least one from a set of: a server latency, a storage limit, a storage quota, a scalability factor, a backup guarantee, and/or an uptime guarantee; and the one or more extendable parameters comprising at least one from a set of: a processing power, a concurrent maximum users limit, a data roll back capacity, a real-time mirroring capability, a resource usage reporting capability, an audit trail capability, and/or a support capability, and/or an automatic parallelization of code for a parallel computing environment.

7. A computing device comprised within a source cloud to implement a spiral protocol for iterative Service Level Agreement (SLA) execution in a cloud migration from the source cloud to a target cloud, the computing device comprising:
a memory configured to store instructions; and
a processing unit configured to execute a migration application in conjunction with the instructions, wherein the migration application is configured to:
determine SLA parameters;
categorize each SLA parameter within the SLA parameters into groups;
form the spiral protocol based on the SLA parameters and the groups, wherein each group corresponds to a loop of the spiral protocol, the SLA parameters are organized from an inner loop to a first outer loop to a second outer loop of the spiral protocol according to an importance level of the SLA parameters, and the SLA parameters are selected by one or more of: a source cloud operator, a target cloud operator, and a third party facilitator;
execute the cloud migration from the source cloud to the target cloud by following the spiral protocol one loop at a time;
in response to a determination that an execution of the inner loop corresponding to one or more core parameters is unsuccessful during the cloud migration from the source cloud to the target cloud, terminate the cloud migration; else in response to a determination that the execution of the inner loop is successful, execute the first outer loop corresponding to one or more extendable parameters; and in response to a determination that the execution of the first outer loop is unsuccessful during the cloud migration from the source cloud to the target cloud, skip continued execution of the first outer loop and execute the second outer loop.

8. The computing device according to claim 7, wherein the migration application is configured to categorize the SLA parameters into groups includes one or more of: a user input, an automated algorithm, and/or a code-based population of the parameter groups modifiable by the user.

9. The computing device according to claim 7, wherein each SLA parameter's definition includes instructions for actions to be taken for backtracking if migration of the SLA parameter from the source cloud to the target cloud is unsuccessful.

10. The computing device according to claim 7, wherein the migration application is further configured to:
facilitate negotiation of the SLA parameters between the source cloud and the target cloud; and
perform a dry-run of the cloud migration from the source cloud to the target cloud without moving data.

11. The computing device according to claim 7, wherein the cloud migration further includes one of: migration from the source cloud to multiple target clouds, including the target cloud, migration from multiple source clouds, including the source cloud, to the target cloud, and migration from multiple source clouds, including the source cloud, to multiple target clouds, including the target cloud.

12. A non-transitory computer-readable storage medium having instructions stored thereon to implement a spiral protocol for iterative Service Level Agreement (SLA) execution in a cloud migration from a source cloud to a target cloud, the instructions comprising:
determining, by one or more devices comprised within the source cloud, SLA parameters;
categorizing, by the one or more devices, each SLA parameter within the SLA parameters into groups;
forming, by the one or more devices, the spiral protocol based on the SLA parameters and the groups, wherein each group corresponds to a loop of the spiral protocol, the SLA parameters are organized from an inner loop to a first outer loop to a second outer loop of the spiral protocol according to an importance level of the SLA parameters, and each group includes one or more core parameters and extendable parameters;
executing, by the one or more devices, the cloud migration from the source cloud to the target cloud by following the spiral protocol one loop at a time;
in response to a determination that an execution of the inner loop corresponding to the one or more core parameters is unsuccessful during the cloud migration from the source cloud to the target cloud, terminating, by the one or more devices, the cloud migration; else in response to a determination that the execution of the inner loop is successful, executing, by the one or more devices, the first outer loop corresponding to the one or more extendable parameters; and in response to a determination that the execution of the first outer loop is unsuccessful during the cloud migration from the source cloud to the target cloud, skipping, by the one or more devices, continued execution of the first outer loop and executing, by the one or more devices, the second outer loop.

13. The non-transitory computer-readable storage medium of claim 12, wherein the instructions further comprise:
   implementing, by the one or more devices, a progression of the spiral protocol incrementally with fault tolerance by one or more of re-trial and roll-back; and
   providing, by the one or more devices, the fault tolerance if the spiral protocol cannot progress further because of a failure of the source cloud and the target cloud to agree on one more SLA parameters.

14. The non-transitory computer-readable storage medium of claim 12, wherein the instructions further comprise:
   back-tracking, by the one or more devices, the cloud migration from the source cloud to the target cloud to re-negotiate the cloud migration repeatedly.

15. The non-transitory computer-readable storage medium of claim 12, wherein the one or more core parameters comprise at least one from a set of: a server latency, a storage limit, a storage quota, a scalability factor, a backup guarantee, and/or an uptime guarantee; and the one or more extendable parameters comprise a set of flexible parameters and a set of optional parameters, each comprising at least one from a set of: a processing power, a concurrent maximum users limit, a data roll back capacity, a real-time mirroring capability, a resource usage reporting capability, an audit trail capability, and/or a support capability, and/or an automatic parallelization of code for a parallel computing environment.

16. The non-transitory computer-readable storage medium of claim 12, wherein the instructions further comprise:
   facilitating, by the one or more devices, negotiation of the SLA parameters between the source cloud and the target cloud; and
   performing, by the one or more devices, a dry-run of the cloud migration from the source cloud to the target cloud without moving data, wherein each SLA parameter's definition includes instructions for actions to be taken for backtracking if migration of the SLA parameter is unsuccessful.

* * * * *

UNITED STATES PATENT AND TRADEMARK OFFICE
CERTIFICATE OF CORRECTION

| | | |
|---|---|---|
| PATENT NO. | : 9,160,681 B2 | Page 1 of 2 |
| APPLICATION NO. | : 13/641126 | |
| DATED | : October 13, 2015 | |
| INVENTOR(S) | : Seth | |

It is certified that error appears in the above-identified patent and that said Letters Patent is hereby corrected as shown below:

On the Title Page, insert item -- (30) Foreign Application Priority Data
January 27, 2012 (IN)............. 234/DEL/2012 --.

In the specification

In Column 1, Line 9, delete "§371" and insert -- § 371 --, therefor.

In Column 1, Line 11, delete "§119(a)" and insert -- § 119(a) --, therefor.

In Column 2, Line 33, delete "accompanying, drawings," and insert -- accompanying drawings, --, therefor.

In Column 3, Line 22, delete "boat" and insert -- host --, therefor.

In Column 5, Line 9, delete "test/dry nm/shell run," and insert -- test/dry run/shell run, --, therefor.

In Column 5, Line 23, delete "illustrates as" and insert -- illustrates an --, therefor.

In Column 6, Line 2, delete "processor care" and insert -- processor core --, therefor.

In Column 6, Line 14, delete "program data." and insert -- program data --, therefor.

In Column 6, Line 19, delete "data SLA" and insert -- data, SLA --, therefor.

In Column 7, Line 22, delete "as apart of" and insert -- as a part of --, therefor.

In Column 8, Line 65, delete "mare groups," and insert -- more groups, --, therefor.

In Column 9, Line 10, delete "more of a" and insert -- more of: a --, therefor.

Signed and Sealed this
Eighth Day of March, 2016

Michelle K. Lee
*Director of the United States Patent and Trademark Office*

CERTIFICATE OF CORRECTION (continued)
U.S. Pat. No. 9,160,681 B2

In the specification

In Column 9, Line 14, delete "aloud" and insert -- cloud --, therefor.

In Column 9, Line 48, delete "one of a" and insert -- one of: a --, therefor.

In Column 10, Line 44, delete "include one of" and insert -- include one of: --, therefor.

In Column 11, Line 5, delete "one or more of a" and insert -- one or more of: a --, therefor.

In Column 11, Line 16, delete "a set of" and insert -- a set of: --, therefor.

In Column 12, Line 9, delete "those killed" and insert -- those skilled --, therefor.

In Column 12, Line 55, delete "heroin," and insert -- herein, --, therefor.